US006559611B1

(12) United States Patent
Satake et al.

(10) Patent No.: US 6,559,611 B1
(45) Date of Patent: May 6, 2003

(54) METHOD FOR STARTING A LOAD BY ENGINE-DRIVEN GENERATOR AND ENGINE-DRIVEN GENERATOR

(75) Inventors: Satoru Satake, deceased, late of Tokyo (JP), by Toshiko Satake, legal representative; Yukio Hosaka, Tokyo (JP); Hideharu Maruyama, Tokyo (JP); Yuuji Matsumoto, Tokyo (JP); Kiyonori Nakaoka, Tokyo (JP)

(73) Assignee: Satake Corporation (JP)

( * ) Notice: Subject to any disclaimer, the term of this patent is extended or adjusted under 35 U.S.C. 154(b) by 52 days.

(21) Appl. No.: 09/706,281

(22) Filed: Nov. 3, 2000

(30) Foreign Application Priority Data

Nov. 4, 1999 (JP) .............................................. 11-313462

(51) Int. Cl.⁷ ............................... H02P 5/20; H02P 5/22
(52) U.S. Cl. ....................................................... 318/145
(58) Field of Search ............................... 318/140, 145, 318/147; 322/29

(56) References Cited

U.S. PATENT DOCUMENTS 5,493,201 A * 2/1996 Baker
6,051,951 A * 4/2000 Arai et al. .............. 318/145 X

* cited by examiner

Primary Examiner—Jeffrey Donels
(74) Attorney, Agent, or Firm—Wells St. John P.S.

(57) ABSTRACT

At a starting of a motor which receives an electric power from a generator driven by an engine, an excitation current controller controls an excitation current so as to cause an output frequency of a generator to approach a predetermined frequency which is lower than a rated frequency when an output voltage detected by an output voltage detector is reduced to lower than a first predetermined voltage. Thereafter, the excitation current controller controls the excitation current so as to cause the output voltage of the generator to be the rated voltage when the output voltage detector detects a second predetermined voltage which is higher than the first predetermined voltage. In this way, the load capacity which enables the starting by the engine-driven generator without directly controlling the engine is improved.

7 Claims, 8 Drawing Sheets

METHOD FOR STARTING A LOAD BY ENGINE-DRIVEN GENERATOR AND ENGINE-DRIVEN GENERATOR

CROSS REFERENCE TO RELATED APPLICATION

This application relates to and claims priority to corresponding Japanese Patent Application No. 313462/1999, which was filed on Nov. 4, 1999, and which is incorporated by reference herein.

BACKGROUND OF THE INVENTION (1) Field of the Invention

The present invention relates to a generator which is driven by an engine (hereinafter referred to as an "engine-driven generator"), and more particularly to an engine-driven generator having improved starting characteristics and requiring no control of the driving engine for starting the load wherein the heavy load is loaded on the output of the generator, for example, the load of the induction motor.

(2) Description of the Prior Art

In the case when an induction motor as a load is started by an engine-driven generator, since there flows a rush-current in the order of 400–800% of the rated current thereof at the starting, it is necessary that the capacity of the generator be two–three times as that of the induction motor, so that the performances of the generator are not sufficient for such case. In other words, if the generator having substantially the same rated capacity as that of the load is used, the revolution number of the driving engine is greatly lowered, or the engine will stop its operation.

In order to improve the above explained problems, conventionally, the following methods by which the input supplied to the induction motor is limited are taken.

(1) At starting, the output voltage of the generator is lowered and the input to the induction motor is limited accordingly (method of reducing voltage).

(2) In addition to the above reducing voltage method, the revolution number of the driving engine is temporarily lowered by the control operation of the governor (i.e., reduction in the supply amount of the fuel). Or, by utilizing the temporary reduction in the revolution number of the driving engine due to the rush current, the slip of the induction motor at the starting is made small, whereby the input supplied to the induction motor is limited to low with the sufficient torque being maintained.

(3) By utilizing an automatic voltage regulating means as disclosed in the Japanese Patent No. 2889972, the revolution number of the engine is temporarily lowered at the time when the load current is high, a voltage which is proportional to the revolution number of the engine is outputted by the automatic voltage regulating means, and the revolution number of the engine is gradually raised up to the rated number of revolution accordingly.

FIG. 9 is a block diagram of an exemplary construction of a device that includes an automatic voltage regulating means in which A denotes an engine, B denotes a generator, C denotes a motor, D denotes an automatic voltage regulator, E denotes a control selection means, F denotes a load current detection means, and G denotes a speed control means.

FIG. 10 is a more detailed block diagram of an exemplary construction of a device that includes an exemplary automatic voltage regulating means in which numeral 1 shows an engine, numeral 2 shows a generator which is driven by the engine 1, and numeral 3 shows an induction motor powered by the output of the generator 2. The induction motor 3 is connected to the generator 2 through a load switch 4 and a breaker 5. Numeral 6 shows an automatic voltage controller, numeral 7 shows a current transformer which is provided at an output circuit of the generator 2, numeral 8 shows a fuel pump for the engine 1, numeral 9 shows an actuator for the fuel pump 8, numeral 10 shows a speed sensor in combination with a rotation gear 10a, for detecting the speed of the engine 1, numeral 11 shows a control selection switch, and numeral 12 shows a speed controller.

The automatic voltage regulator 6 maintains a rated voltage (for example, 220 volts) where the frequencies are within predetermined ranges higher and lower than the rated frequency (for example, 60 Hz). However, the frequency becomes lower than the above predetermined range, the output voltage lowers. FIG. 11 shows exemplary characteristics of such regulator. As shown in a solid line, below a predetermined frequency, the voltage becomes a certain voltage which is set lower than the rated voltage, for example, 50% of the rated voltage. Alternatively, the voltage decreases continuously in proportional to the decrease of the frequency as shown in a dotted line.

The above method (1) is effective for such load having small starting inertia as a pump or a fan. Though the input to such load becomes small proportional to the square of the voltage, the torque generated also becomes small in proportional to the square of the voltage. Therefore, the method can be used only for the case where the load is small at the starting, however, for loads other than such load, it is necessary that the generator having enough capacity be selected as in the conventional way.

In the above method (2), as the input is decreased as the induction motor is accelerated, the revolution number of the engine rises. The motor must be accelerated in the state in which the slip is constantly large and, as a consequence, a prolonged time is required before the motor is accelerated up to the rated revolution number and, during this time, an excess current flows so that the generator requires the capacity such that the excess current breaker does not operate in the course of starting the motor.

With the method (3), the starting is easy because, as compared with conventional systems, the output voltage is proportionally controlled by the revolution number of the motor and the automatic voltage regulating means. However, since the revolution number of the engine is changed in a plurality of steps, it requires a fuel control section for precisely controlling the revolution number of the engine, which leads to a high cost of the entire system. Also, since the revolution number of the engine is caused to be lowered, the output of the engine with respect to the torque required by the load side is inevitably lowered.

SUMMARY OF THE INVENTION

In view of the foregoing, an object of the invention is to improve the load capacity which enables the starting by the engine-driven generator without directly controlling the engine and to realize a method of starting an engine-driven generator at a low cost and to provide the engine-driven generator without requiring complicated costly equipment. Also, since the starting time is, in any case, limited by V/F constant characteristics, in order to shorten further the starting time or to increase the load capacity by causing the starting current to be lowered, there is no alternative but to increase the capacity of the generator.

As a means to solve the above problem, the present invention provides a method for starting the load of the engine-driven generator and provides the engine-driven generator which controls the generator excitation current such that, at the starting of the motor to which the power is supplied by the engine generator, when the generator output voltage has become lower than a predetermined voltage, the output frequency of the generator approaches the predetermined value lower than the rated frequency, and subsequently when the generator output voltage has arisen to the second predetermined voltage which is higher than the first predetermined voltage, the generator output voltage becomes the rated voltage.

According to the invention, in order to start the motor which becomes the heavy load with respect to the generator capacity, when after the starting, the output voltage (for example, rated 220 volts) of the generator has become lower than the first predetermined voltage (for example, 200 volts) determined in advance, the revolution number of the engine is such as to be lowered to the predetermined number by the control of the generator excitation current. The generator excitation current is controlled so that the load of the load of the generator is raised and, since the revolution number of the engine rises due to the increase in the load, the revolution number of the generator driven thereby is lowered. Specifically, the generator load is increased by the increase in the excitation current and, by lowering the revolution number of the driving engine, the excitation current is controlled so that the generator output frequency (for example, 60 Hz) becomes the predetermined frequency (for example, 33 Hz). That is, the control is made for the excitation current to be increased in order to increase the generator load. By controlling the excitation current so as to approach the predetermined frequency, the motor torque can be maintained while the input current is suppressed to low in the state in which the output frequency of the generator is low and the slip of the motor at the starting is small, thereby enabling the smooth starting and the enhancement of starting characteristics.

In the foregoing, when the excitation current is increased, the revolution number of the engine is lowered. However, unlike under the prior art, the lowering of the revolution number of the engine is not performed by restricting the fuel, that is, no fuel control is performed. That is, the output torque characteristic curve of the engine is not changed. The output torque is changed along the lowering of the revolution number following such torque characteristic. The fact that the torque characteristic of that time is of larger output torque, at the same revolution number, than the output torque in which the revolution number is lowered by restricting the fuel, is clear from the change in the torque characteristic curve with respect to the fuel supplying amount of the engine.

After the starting, while the excitation current mentioned above is being controlled, the revolution of the motor rotor rises and, with this rise, the starting current is lowered and the generator output voltage rises. When generator output voltage rises to the predetermined voltage, the excitation current is controlled so that the generator output voltage becomes the rated voltage (for example, 220 volts). Here, it can be considered that the excitation current be controlled following the conventional V/F constant characteristic starting from the time when the output voltage has become 95%, for example, 209 volts with respect to the rated 220 volts. According to the invention, since the output voltage is larger as compared with the voltage value with respect to the frequency at the V/F constant characteristic, it has been found that there appears a phenomenon in which the output voltage once lowers down by the switching. Thus, the finding is that, when the output voltage is raised to about 95% while the excitation current is controlled so as to be approached to a low frequency, and the control of the excitation current is switched so as to become the rated voltage, the rated frequency and the rated voltage can be ensured to be established.

Further, according to the invention, in the course of making the generator output voltage to the rated voltage, when the detection is made that the output frequency of the generator has become the rated frequency (for example, 60 Hz), the control is shifted to the control of the generator excitation current based on the FV characteristics by the output voltage and the frequency.

The term "FV characteristics" here refers to the so-called "AVR" control which covers the V/F constant characteristics at the low frequency region and the constant voltage characteristics at the high frequency region. According to the invention, after the rated voltage is once established at the starting, the control is shifted to that for AVR control following the general FV characteristics.

As above, at the starting of the motor, the excitation of the generator is increased and the braking action is exerted to the generator and, as a consequence, the revolution number of the engine is controlled so that a high cost equipment for making a fuel control is unnecessary. Also, since the fuel control is not relied upon, the output torque characteristic curve of the engine does not change so that, even when the number of revolution of the engine is lowered, the generator can be driven without sudden lowering of the output torque. Further, even when the load to the generator is increased, the generator is driven firmly by the engine which does not undergo the sudden lowering of the output torque, and it is possible to elevate the limit at which the engine stops due to an excessively high load, and to enhance the load capacity by which the generator can carry the load.

At the starting, the excitation current is increased and the output frequency of the generator is lowered so that the motor torque is maintained while the slip of the motor is made small and, by suppressing the input current, the raising of the revolution number of the motor to the predetermined number is smoothly carried out. Thus, the starting current does not flow for an extended time and, since the excess current can be prevented, the starting with a heavy load is enabled.

According to the invention, each of the various parts concerned is controlled by relying not on the monitoring of the load current but on the monitoring of the progress in the rising of the output voltage of the generator. That is, the subject covered by the invention is different from the subject in which the control is made by detecting the load current.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENT OF THE INVENTION

Figure 1:
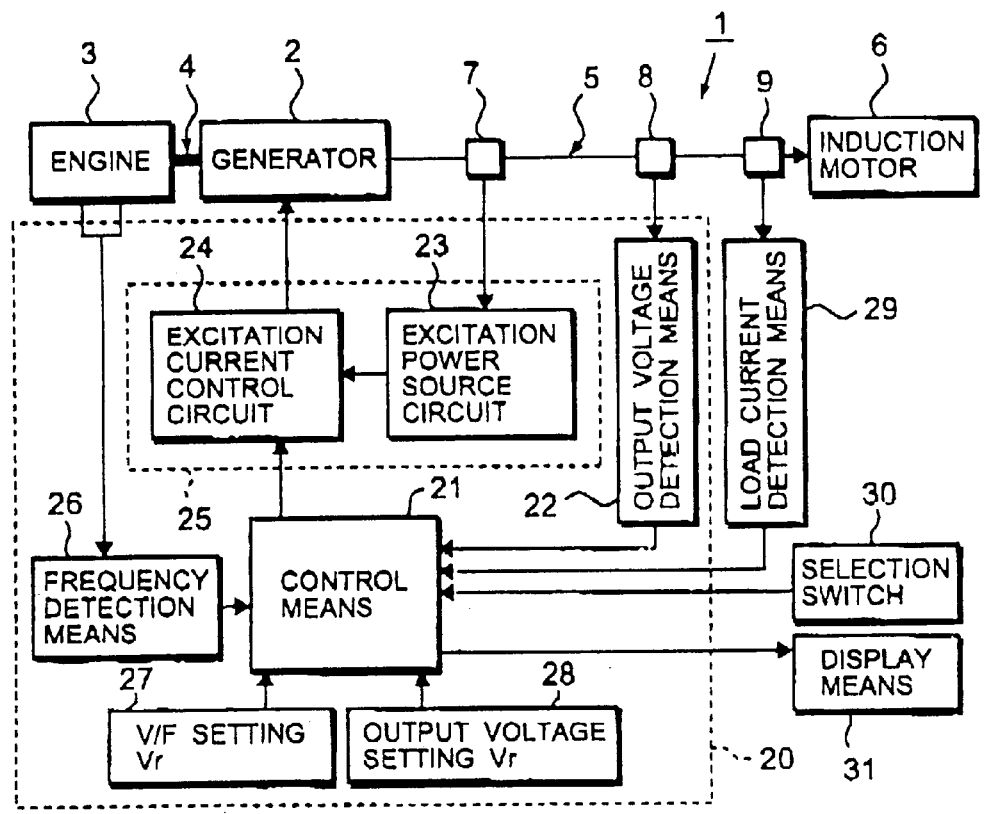
FIG. 1 is a block diagram showing an engine-driven generator according to the invention.

An engine-driven type generator as a preferred embodiment according to the invention will be explained hereunder with reference to FIG. 1 to FIG. 3. FIG. 1 is a block diagram of the engine-driven generator 1 of the invention. A generator 2, for example, a self-excitation generator is coupled to an engine 3, for example, a diesel engine, by means of a rotating shaft 4. The generator 2 is driven by the engine 3. The electric power generated by the generator 2 is supplied to, for example, a load of such a motor as an induction motor 6 through a three-phase supply line 5. On the supply line 5, there are provided a connection circuit 7 for obtaining an electric power for the excitation windings (not shown in the drawings) of the generator 2, a detection circuit 8 for detecting the output voltage of the generator 2, and a detection circuit 9 for detecting the load current.

The generator 2 is controlled by a voltage regulating device 20 as explained later. The voltage regulating device 20 includes a control means 21 as a main component. The voltage regulating device 20 further includes an output voltage detection means 22 which outputs to the control means 21 a value of an output voltage detected by the detection circuit 8; a frequency detection means 26 which calculates a frequency of the generated electric power based on the detected revolution number of the engine 3 and the number of poles of the windings of the armature of the generator 2 and outputs the calculated frequency to the control means 21; a V/F setting volume 27 through which a desired V/F (output voltage/frequency) value is set to the control means 21; and an output voltage setting volume 28 through which a desired output voltage of the generator 2 is set to the control means 21. The voltage regulating device 20 further includes an excitation current control means 25 which is formed by an excitation power source circuit 23 (e.g., a rectifying circuit) that derives electric power from the connection circuit 7 and forms an excitation power source; and an excitation current control circuit 24 (e.g., a chopper circuit) that controls the value of the excitation current based on the electric power from the excitation power source circuit 23 and the instructions from the control means 21.

Figure 2:
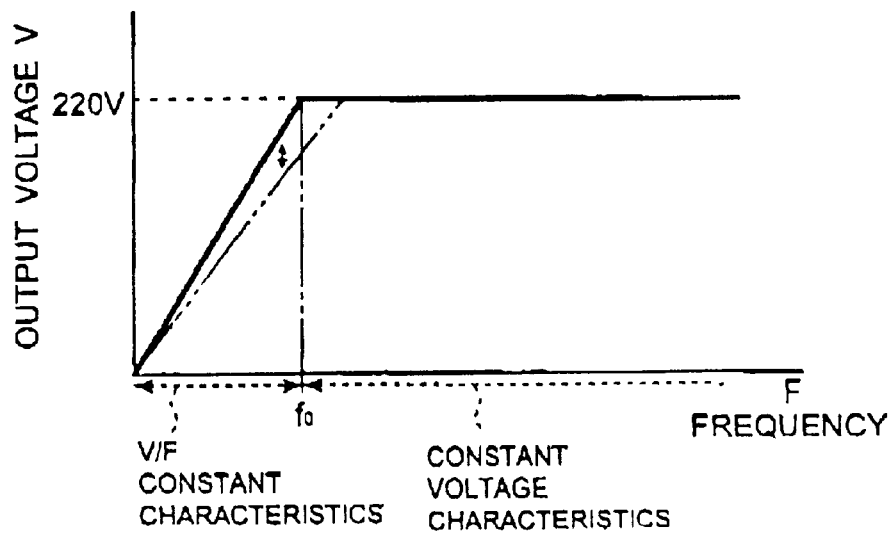
FIG. 2 is an FV characteristic curve of the voltage regulating device of the invention.

Here, with reference to FIG. 2, the V/F setting volume 27 and the output voltage setting volume 28 are explained. The setting of the V/F value by the V/F setting volume 27 is equivalent to the shifting of the V/F constant characteristics of the general automatic voltage regulating (AVR) device. Specifically, as shown in FIG. 2, a slanted portion is shifted. The setting of the output voltage by the output voltage setting volume 28 is such that the output voltage of 220 volts is set for 60 Hz whereas that of 200 volts is set for 50 Hz.

Further, to the voltage regulating device 20, there are connected a load current detection means 29 which is connected to the detection circuit 9 and outputs a value of load current to the control means 21; an instruction means 30 (hereinafter referred to as a "selection switch 30") which instructs a heavy-load starting to the control means 21; and a display means 31 such as a lamp which indicates the condition of load starting by the control means 21.

Figure 3:
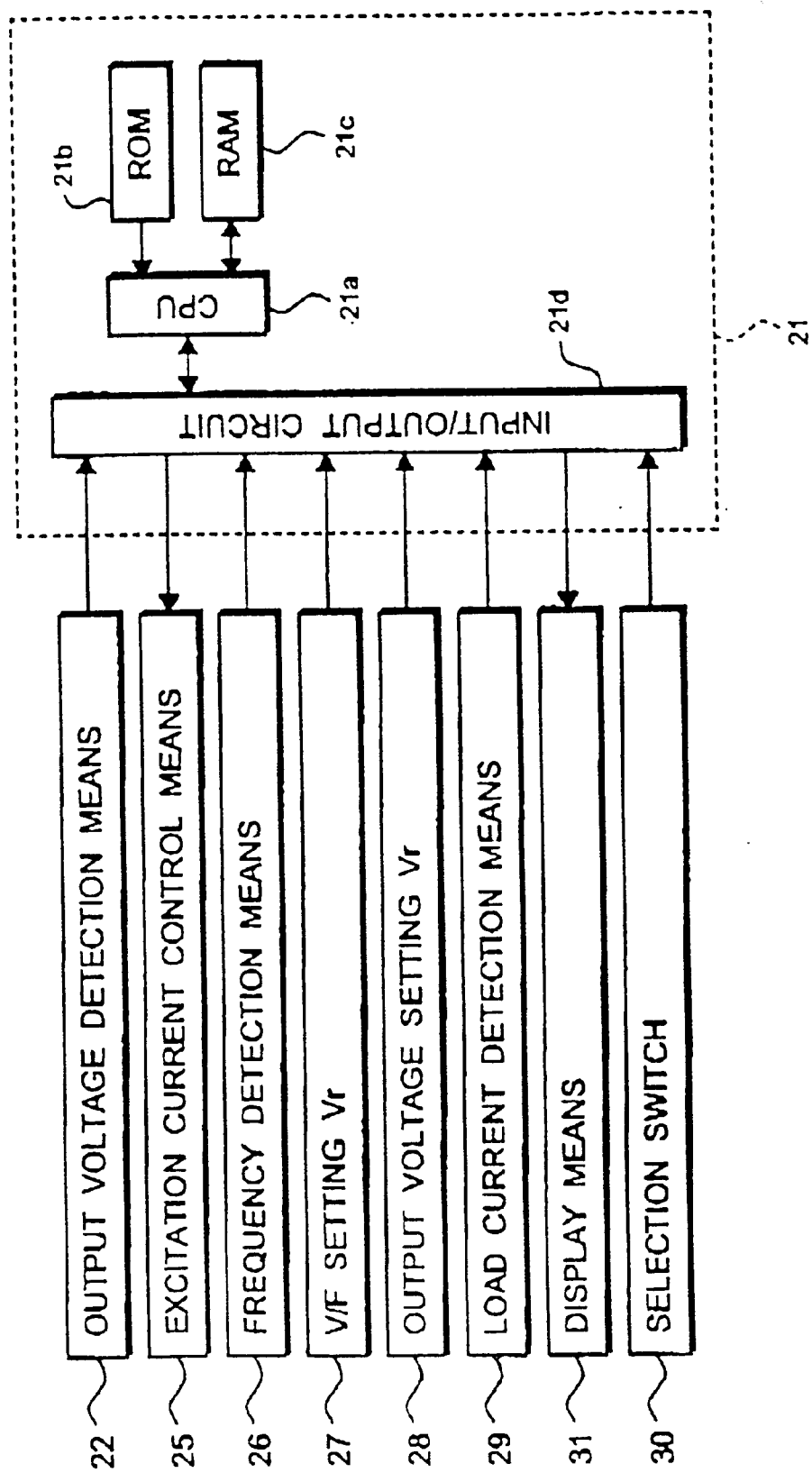
FIG. 3 is a block diagram showing the control means of the generator.
Figure 4:
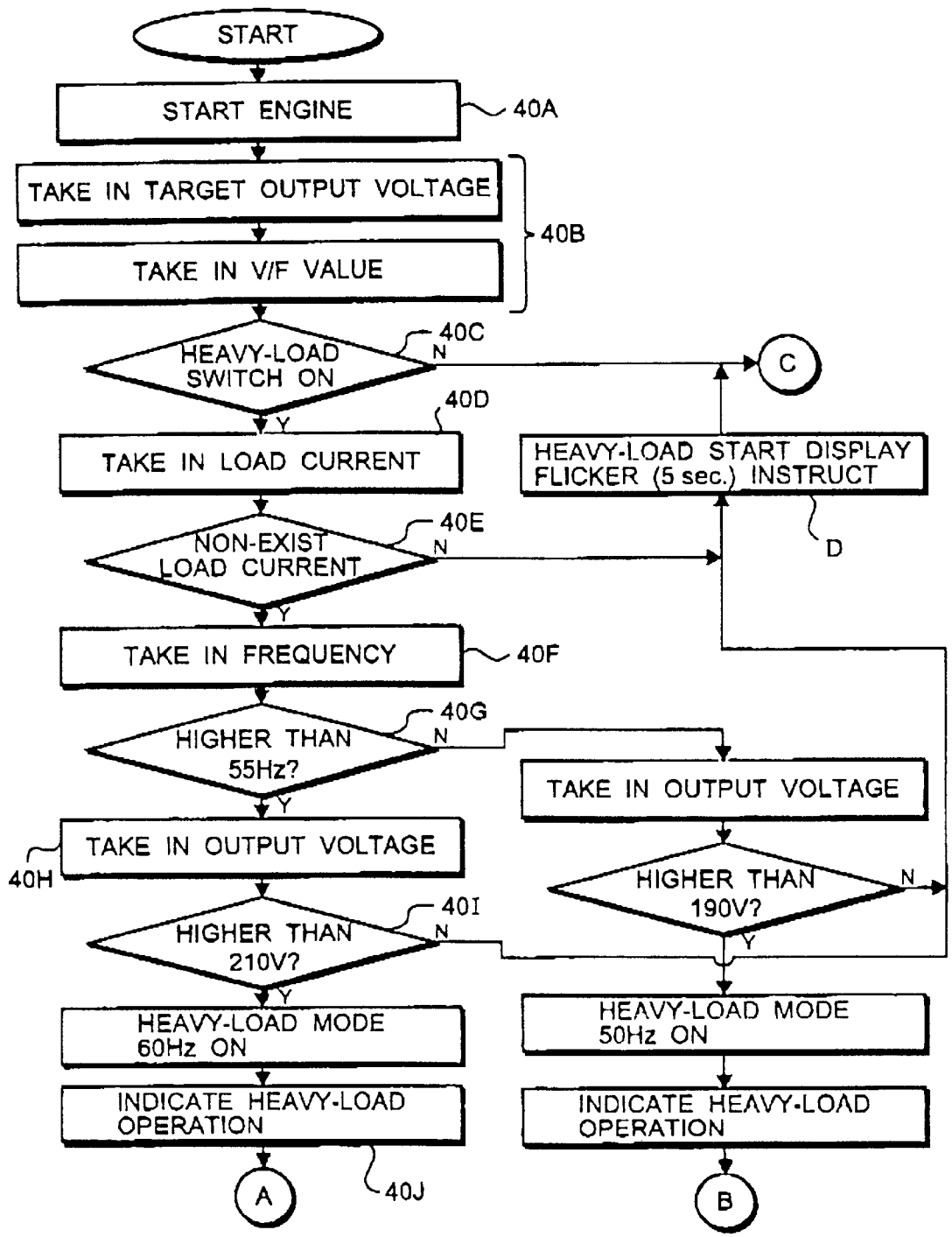
FIG. 4 is a flow chart showing the program for starting the engine-driven generator of the invention.

The control means 21 is further explained here with reference to FIG. 3. The control means 21 comprises a central processing unit (CPU) 21a connected to which are a read only memory (ROM) 21b storing therein an excitation current control program for the starting operation and the steady state operation; a data rewritable or random access memory (RAM) 21c; and an input/output circuit 21d for effecting the data input and output between the respective components concerned.

Now, the starting of the heavy load and the light load is respectively explained with reference to FIG. 4 through FIG. 8. In the flow chart shown in FIG. 4, first, the engine 2 is started (in Step 40A) and, then, the values set by the output voltage setting volume 28 and the V/F setting volume 27, respectively, are taken in (in Step 40B) and stored in the RAM 21c. It is determined whether the heavy-load starting is instructed by the selection switch 30 (in Step 40C). If there is no heavy-load starting instructions, the procedure is moved to the program (C) for the normal light-load starting. If the heavy-load is instructed, a value of load current is obtained through the load current detection means 29 (in Step 40D). If the presence of the load current is confirmed (in Step 40E) and any amount of the load current is detected, simultaneously with the starting of the load, it is determined that other load is connected to the generator and the procedure then moves to the program (D) in which the condition where the heavy-load starting is unavailable is displayed. The presence of the load current means that other load is loaded on the generator and, thus, it is expected that the heavy-load starting affects on the operation of other load presently connected. Thus, in this case, the heavy-load starting cannot be effected.

If no load current is detected in the step 40E, the frequency is taken in from the frequency detection means 26 (in Step 40F). It is determined whether the frequency is 60 Hz (in Step 40G). If the frequency is determined as 60 Hz, the procedure advances to the heavy-load mode for 60 Hz given on left half of flow chart, whereas, if the frequency is determined as 50 Hz, the procedure advances to the heavy-load mode for 50 Hz given on the right half of the flow chart. The output voltage at the non-loaded state is obtained here by the output voltage detection means 22 (in Step 40H). It is determined whether the detected output voltage is above the rated output voltage, for example, 210 volts (in this case, the voltage is determined whether it is near 220 volts) (in Step 40I). If the output voltage is determined as less than 210 volts, it is decided that the set value by the output voltage setting volume 28 is low or other defects exist, and the procedure advances to the program (D) which indicates the unavailability of the heavy-load starting. If the output voltage is confirmed as higher than 210 volts, this is communicated to the display means 31 for indicating the availability of the heavy-load starting.

Figure 5:
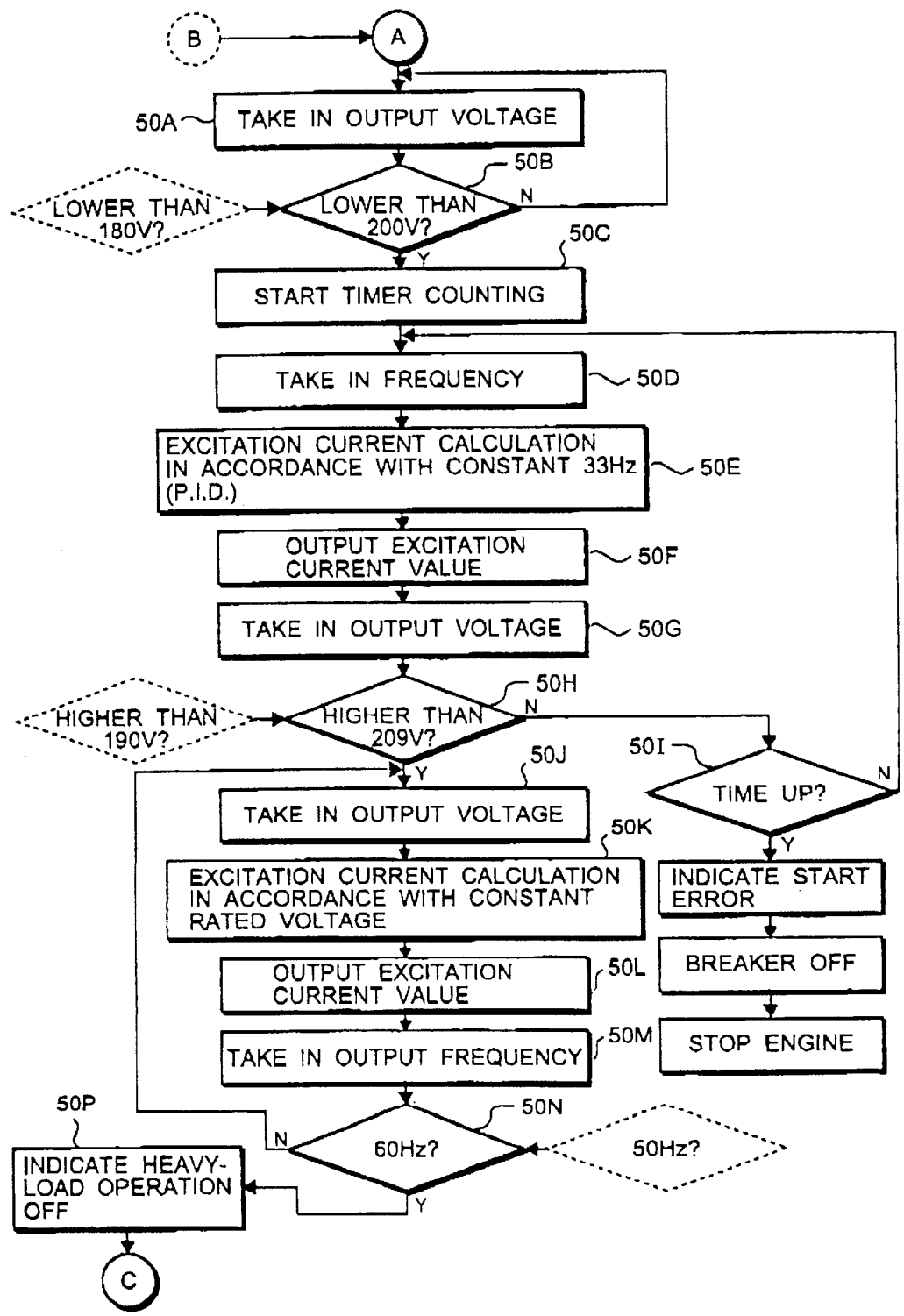
FIG. 5 is a flow chart showing the program for starting the engine-driven generator of the invention.

Next, with reference to FIG. 5, the operation of the heavy-load starting which is a main feature of the invention is explained. The output voltage is taken in through the output voltage detection means 22 (in Step 50A), and it is determined whether the output voltage is lower than the first voltage value 200 volts (in Step 50B). If the output voltage is lower than 200 volts (see "START" position in FIG. 8), it is determined that the heavy-load is connected. If the output voltage has not yet been to a voltage lower than 200 volts, the output voltage under the state where the heavy-load is connected is repeatedly detected until it becomes lower than 200 volts. Further, a procedure for releasing the heavy-load starting may be added. Upon the detection of the output voltage less than 200 volts, counting of lapse time of the timer limiting the starting time is started (in Step 50C). Then, the value of frequency is taken in from the frequency detection means 26 (in Step 50D), and the excitation current is calculated based on the difference between the taken-in frequency and a predetermined frequency which is set in advance at a value lower than 60 Hz, for example, 33 Hz (in Step 50E). The excitation current thus calculated is outputted to the excitation current control means 25 (in Step 50F). Such controlling is illustrated as a frequency constant control period in FIG. 8. Next, the output voltage is detected through the output voltage detection means 22 (in Step 50G), and it is determined whether the value of the output voltage detected is higher than the second voltage of 209 volts (in Step 50H). If not, it is confirmed whether the counting of timer is timed up and the value of frequency is taken in (in Step 50D), and then the controlling of the excitation current is repeatedly performed so that the value of frequency approaches the above 33 Hz, for example.

Figure 6:
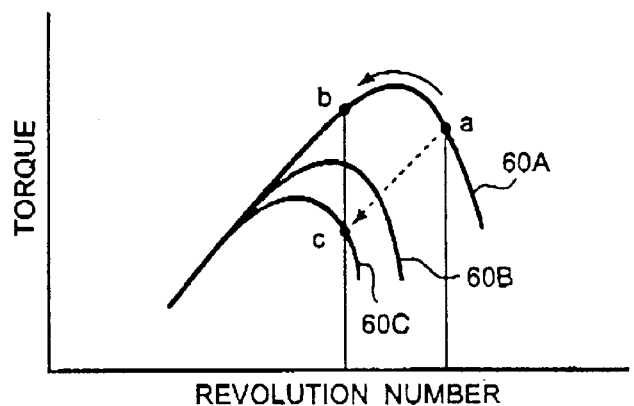
FIG. 6 is a graph showing the torque characteristic curves of the engine.

Here, how the frequency is controlled to 33 Hz only by the excitation current is explained with reference to FIG. 6. FIG. 6 is an example of torque-characteristic graph curves of the engine. The horizontal line of the graph indicates a revolution number whereas the vertical line thereof indicates an output torque. The curve 60A shows the torque characteristics at the rated revolution number. The curves 60B and 60C respectively show the torque characteristics in accordance with the reduction of the revolution number. Since the fuel control is not done in the engine according to the present invention, the torque characteristics at the rated revolution number becomes as shown in the curve 60A, and the torque at the rated revolution number is shown as the point "a" on the curve 60A. As noted above, in accordance with the increase in the load of the generator due to the increase of the excitation current, the revolution number of the engine is reduced to the point "b" (33 Hz) in accordance with the increase in the load of the generator.

Therefore, in the present invention, since there is no controlling of the fuel to the generator, the initial torque characteristics do not change but the revolution number only is reduced. In the conventional method wherein the supply of fuel is reduced and the revolution number is lowered accordingly, the torque characteristics themselves change and the point corresponding to the point "a" becomes the point "c" on the curve 60C. As readily understood therefrom, the torque at the point "b" according to the present invention is much larger than that at the point "c" of the prior method. This greatly contributes to the effect that the load of the generator which is capable of starting is increased. Here, the predetermined frequency 33 Hz has been selected as such value for the following reasons. It is well known in the art that as the revolution number is reduced with the braking being applied to the engine, a resonance phenomenon occurs at 26–27 Hz, for example. The predetermined frequency should be determined with the facts being taken into consideration that it is higher than the above resonance frequency and the minimum revolution number of the generator where the excitation current necessary for the controlling can be kept because the generator is of a self-excitation type. However, the predetermined number of frequency may be appropriately changed depending on the engine and the generator.

As explained above, the repetition of the step 50D to step 50H is for maintaining the slip of the rotor of the motor small at the starting with the frequency of the generated power being kept low by the controlling of the amount of the excitation current. In this way, not only the input current to the motor can be limited to a low value but also the revolution number of the motor can be speedily raised up to the rated revolution number.

Figure 8:
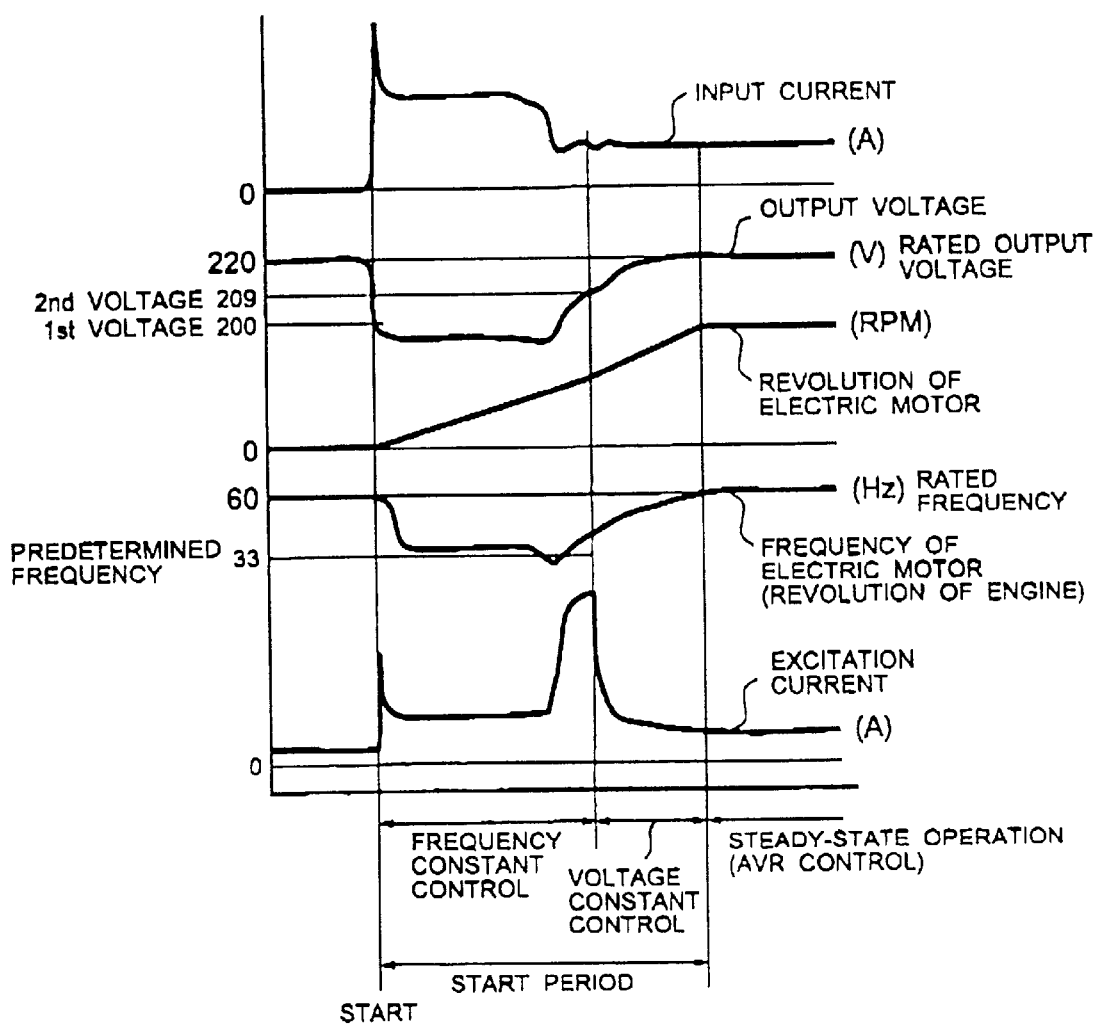
FIG. 8 is a graph showing the variations in the output voltage and frequency of the generator and the variations in the revolution number and input current of the motor at the starting.
Figure 9:
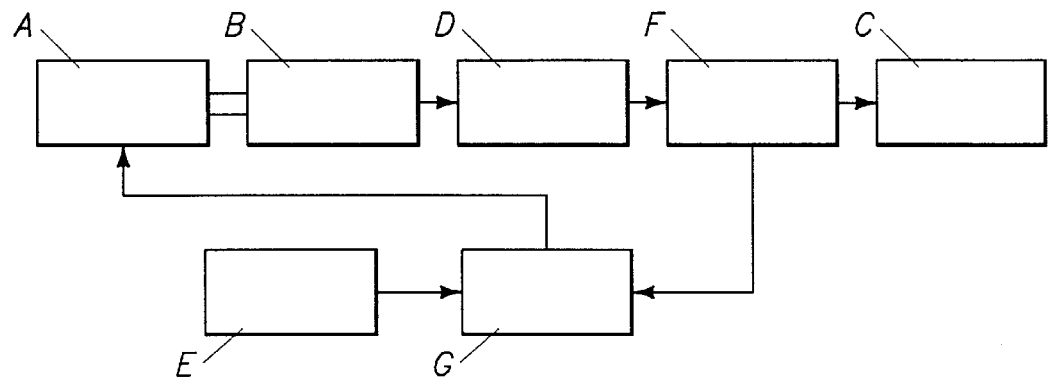
FIG. 9 is a block diagram of an exemplary construction of a device that includes an automatic voltage regulating means as taught by Japanese Patent No. 2889972, incorporated herein at page 2 of this application.
Figure 10:
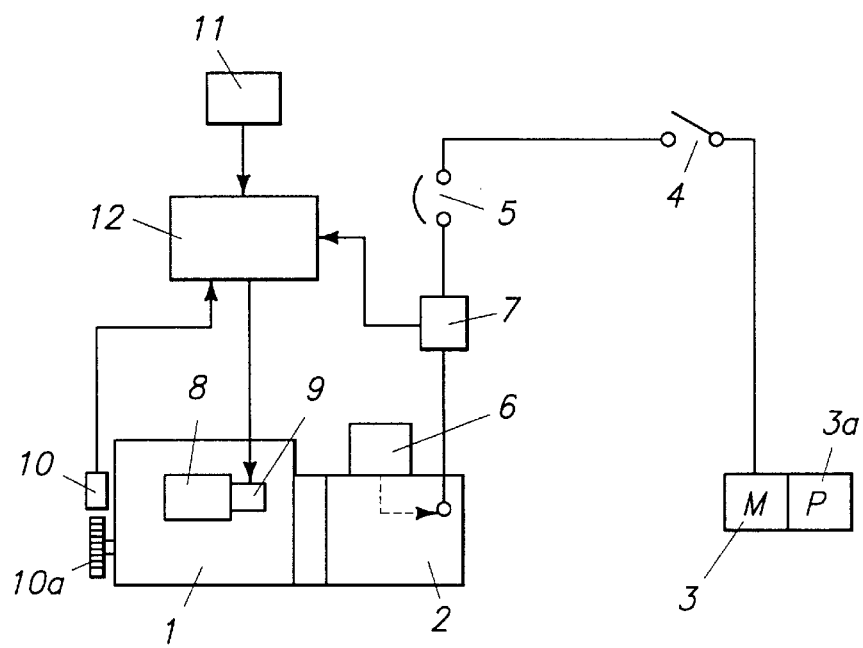
FIG. 10 is a more detailed block diagram of an exemplary construction of a device that includes an exemplary automatic voltage regulating means as taught by Japanese Patent No. 2889972, incorporated herein at page 2 of this application.
Figure 11:
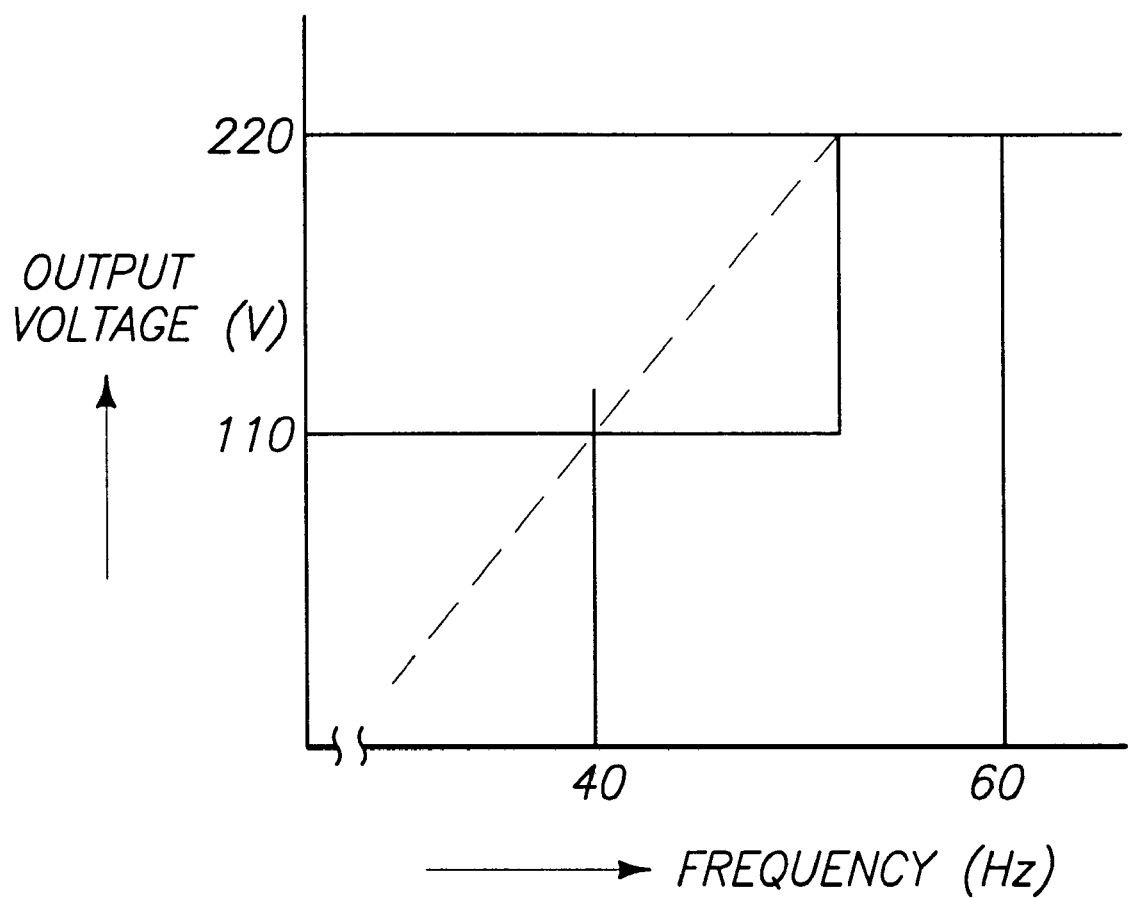
FIG. 11 is a graph illustrating exemplary characteristics of an exemplary automatic voltage regulating means as taught by Japanese Patent No. 2889972, incorporated herein at page 2 of this application.

Simultaneously with the starting of the load motor, the frequency of the excitation current is calculated and outputted so that it becomes a predetermined low frequency (for example, 33 Hz). As the revolution number of the motor increases and when it reaches near the synchronous speed, the current abruptly lowers and the voltage tends to rise up. Around this point, the frequency changes its attitude to increase. That is, the deviation for the frequency constant controlling becomes large. On the other hand, the excitation is abruptly enhanced and the output voltage is greatly increased accordingly. As the input current decreases in accordance with the increase in the revolution number of the motor, since the output voltage goes up, at this time, an output voltage greater than 209 volts begins to be detected by the repetition of the step 50D to the step 50H. Upon the detection of the output voltage greater than 209 volts, the output voltage is taken in (in Step 50J), and an excitation current which causes the output voltage to be the rated voltage is calculated based on the deviation of the taken-in output voltage from the rated voltage (in Step 50K). The excitation current thus calculated is outputted to the excitation current control means 25 (in Step 50L). Next, the frequency is taken in from the frequency detection means 26 (in Step 50M), and it is determined whether the taken-in frequency is 60 Hz (in Step 50N). If the frequency is not 60 Hz, the procedures from the step 50J to the step 50M are repeated. This is shown in FIG. 8 as a voltage constant controlling period. If 60 Hz is detected in the step 50N, the indication of the heavy-load mode is turned off (in Step 50P) and the procedure advances to the program (C) for starting the light-load. If the output voltage greater than 209 volts is not detected in the above step 50H, it is confirmed whether the time up to the 95% voltage of the timer counting is timed up or not (in Step 50I). If the time-up is confirmed, a starting error is displayed and a breaker (not shown) is turned off, thereby stopping the engine.

Figure 7:
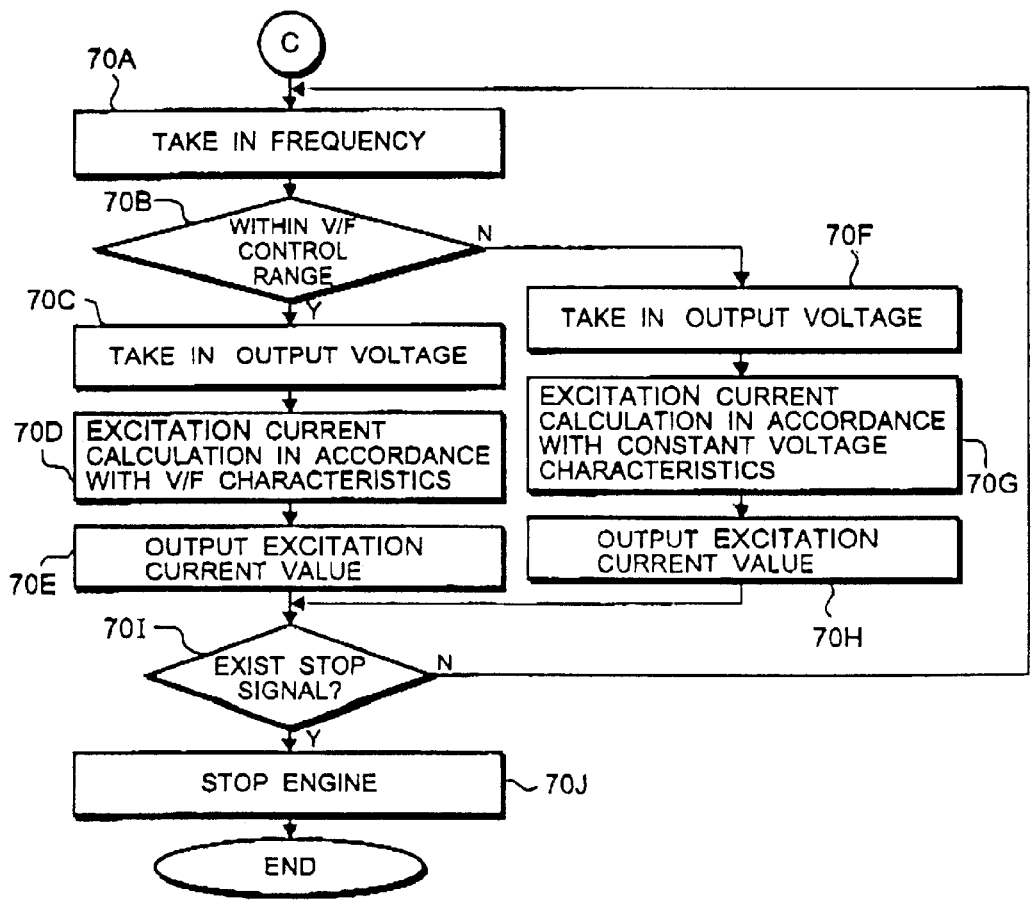
FIG. 7 is a flow chart showing the program for controlling the excitation current based on the FV characteristics at the starting.

Next, the program (C) is explained here with reference to FIG. 7. The control according to the program (C) is similar to the conventional AVR control and, in this application, it is referred to as the F/V characteristic control. The value of the frequency is taken in from the frequency detection means 26 (in Step 70A), and it is determined whether this taken-in frequency is within the V/F constant characteristic period or within the constant voltage characteristic period (in Step 70B) in FIG. 2. If the frequency is within the V/F constant characteristic period, the output voltage is taken in from the output voltage detection means 22 (in Step 70C) and then an appropriate excitation current is calculated in accordance with the V/F constant characteristics set by the V/F setting volume 27 (in Step 70D). Instructions corresponding to the calculated excitation current value are outputted to the excitation current control means 25 (in Step 70E). Here, the excitation current is controlled in accordance with the V/F constant characteristics. By the repetition of these steps, the frequency is taken-in in the step 70 and the frequency is determined whether it is within the V/F constant period.

After the frequency enters within the constant voltage characteristic range in accordance with the increase in the revolution number of the generator, the output voltage is obtained from the output voltage detection means 22 (in Step 70F) and an excitation current corresponding to the constant voltage characteristics (V=220, F>f0) based on the voltage set by the output voltage setting volume 28 (in Step 70G). Instructions corresponding to the calculated excitation current value are outputted to the excitation current control means 25 (in Step 70H). It is determined whether a stop signal is outputted from a not illustrated stopping means (in Step 70I). If no stop signal is detected, the frequency is taken in through the frequency detection means 26 and the above explained controlling is repeatedly conducted. If the stop signal is detected in the step 70I, a power source for the fuel system is turned off and the engine is stopped accordingly (in Step 70J).

When the procedure advances from the heavy-load mode to the program (C), as the output frequency has already been decided as 60 Hz in the step 50N of the program (A), the step 70F is executed in the case of fo=55 Hz. That is, an excitation current according to the constant voltage characteristics is calculated (in Step 70G), and the excitation current thus calcualted is outputted to the excitation current control means 25. When the control is changed to the F/V characteristics, in the case where there are any variations in frequency in any event and the control is within the frequency range of the V/F constant characteristics, the excitation current is controlled according to the V/F constant characteristics.

In summary, it is possible to achieve the heavy-load starting using the structure of the block diagram shown in FIG. 1 and the programs shown in FIGS. 5 and 7. That is, when the output voltage is reduced to the first predetermined voltage (for example, lower than 200 volts), this is recognized as the heavy-load starting, and immediately after the starting, by controlling the excitation current, the frequency of the generated power is controlled so that it becomes lower (for example, 33 Hz) than the rated frequency. Then, upon the detection of the second predetermined voltage (for example, 209 volts which is 95% of the rated voltage), the excitation current is so controlled that the output voltage becomes the rated voltage. Thereafter, after the detection of the rated frequency, the AVR controlling is conducted based on the FV characteristics (i.e., the V/F constant characteristics or the constant voltage characteristics). Further, according to the program shown in FIG. 7, the light-load starting can be effected. That is, the light load is started by controlling the excitation current according to the FV characteristics (V/F constant characteristics of constant voltage characteristics).

The heavy-load starting under 50 Hz can be conducted by replacing the values in the steps 50B, 50H and 50N for the values in the dotted symbols in FIG. 5. Thus, the explanation for 50 Hz is omitted here. Further, in the course where the frequency of the generated power is controlled to approach the predetermined frequency based on the control of the excitation current, as the slip becomes small due to the increase in the revolution number of the generator and the increase in the excitation current, the input current to the motor decreases and the output voltage of the generator increases. At this point, the control is changed to the voltage constant controlling. We have experimentally found that the most suitable timing is at the timing where the output voltage reaches 95% of the rated voltages. If the change is effected at the time between 95% and near 100% of the rated voltage, there occurs an excess voltage due to over-shooting. On the other hand, if the change is effected at the timing of 90% which is short of the above 95%, the revolution number of the engine rises in advance and the output voltage rises with a delay. As a result, the acceleration of the motor is delayed due to the lack of torque.

In order to realize the starting of the induction motor according to the present invention, the load current detection means 29, the selection switch 30 and the display means 31 may be dispensed with, because these components are only for allowing the selection of starting between the heavy-load starting and the light-load starting, or only for indicating the availability of the heavy-load starting in the case where a plurality of loads are to be started. Further, although the frequency detection means 26 has been explained as one in which the frequency is calculated based on the revolution number of the engine, it is also possible to detect the frequency based on the output voltage from the generator as well known in the art.

As explained above, the present invention aims at providing a generator in which the capacity of the heavy-load for starting is enhanced. It is needless to say that the definition of the heavy-load which is capable of being started varies depending on whether the load has a large $GD^2$ or the kinds of the load such as the square law reducing load. For example, as for the motor for driving the water pump, the definition of the heavy-load covers from ½ of the generator capacity to the equivalent capacity (○KVA×0.8) of that of the generator. As for the motor for driving the load having large $GD^2$, the load which has a capacity larger than ¼ capacity of the generator can be defined as a heavy-load. The upper limit of the range in which the load having a large $GD^2$ can be started cannot be made clear by the motor capacity because it varies depending on the magnitude of the $GD^2$.

For reference, in the case where the conventional engine generator is used under the direct-connection starting without using specific starting methods, the upper limit is 7.5 kW where the generator of 25 KVA can start the water pump. However, according to the present invention, it is possible to start the water pump of 10 kW–20 kW.

As explained hereinabove, in the starting of the motor, as the excitation for the generator is enhanced and the braking action is applied to the generator whereby the revolution number of the engine is controlled as a result, the fuel controlling for the engine which requires a high technology and the expensive device for achieving the same have become unnecessary.

Because the generator of the invention is not one in which the revolution number of the engine is reduced by the fuel control, there is no change in the output torque characteristic curve of the engine. Hence, even if the revolution number of the engine is reduced, the generator can be driven without substantial reduction in the output torque. If there occurs an increase in the load on the generator, the generator is sufficiently driven by the engine torque which does not substantially decrease. Thus, the limit point where the engine is stopped by an excess load is effectively improved and it is possible to enhance the load capacity with respect to the generator capacity.

At starting, as the output frequency of the generator is reduced by the control of the excitation current, the input current to the motor can be effectively restricted by making the slip of the motor small and with the output torque being kept. As the increase in the revolution number up to the predetermined number can be performed smoothly, the starting current does not flow for a long time and the excess current can be prevented from occurring whereby the heavy-load can be started.

While the invention has been described in its preferred embodiments, it is to be understood that the words which have been used are words of description rather than limitation.

What is claimed is:

1. A method of controlling an engine-driven generator which supplies a motor with an electric power, said method comprising the steps of:

causing a generator output frequency to approach a predetermined frequency which is lower than a rated frequency thereof by controlling an excitation current of said generator when a generator output voltage is reduced to lower than a first predetermined voltage; and causing, after the generator output voltage rises up to a second predetermined voltage which is higher than said first predetermined voltage, said generator output voltage to be a rated voltage by controlling said excitation current of said generator.

2. A method of controlling an engine-driven generator according to claim 1, in which said step of causing said generator output voltage to be the rated voltage comprises a step of controlling said excitation current of said generator in accordance with FV characteristics of a frequency and an output voltage when said generator output voltage becomes the rated frequency.

3. A method of controlling an engine-driven generator according to claim 1, in which said second predetermined voltage is 95% of the rated voltage.

4. An engine-driven generator system comprising:

a generator which is driven by an engine;

a motor which receives an electric power from said generator;

an output voltage detection means for detecting an output voltage of said generator;

an excitation current controller for controlling an excitation current of said generator;

an output frequency detection means for detecting an output frequency of said generator;

a memory means for storing data information concerning a first predetermined voltage lower than a rated voltage, a second predetermined voltage higher than said first predetermined voltage, and a predetermined frequency lower than a rated frequency; and a control means to which said output voltage detection means, said excitation current controller, said output frequency detection means and said memory means are connected, said control means, at starting of said motor, controlling said excitation current controller so as to cause said output frequency to approach said predetermined frequency when the output voltage detected by said output voltage detection means is reduced to lower than said first predetermined voltage and, thereafter, controlling said excitation current controller so as to cause said output voltage to be the rated voltage when said output voltage detection means detects said second predetermined voltage.

5. An engine-driven generator system according to claim 4, in which said excitation current controller operates to control the generator excitation current in accordance with FV characteristics of a frequency and an output voltage stored as the data information in said memory means in advance when said output frequency detection means detects the rated frequency.

6. An engine-driven generator system according to claim 4, which further comprises a switch means for instructing a heavy-load starting, a load current detection means, and a display means all being connected to said control means, wherein said display means operates to indicate unavailability of heavy-load starting when said load current detection means detects a load current prior to the heavy-load starting in the case where the heavy-load starting is instructed by said switch means.

7. An engine-driven generator system according to claim 6, in which said excitation current controller operates to control said generator excitation current in accordance with said predetermined FV characteristics in the case where the heavy-load starting is not instructed by said switch means.

* * * * *